United States Patent [19]

Prinsloo et al.

[11] Patent Number: 4,985,058

[45] **Date of Patent: * Jan. 15, 1991**

[54] VORTEX TUBE SEPARATING DEVICE

[75] Inventors: Willem J. C. Prinsloo, Pretoria; Pierre De Villiers, Hartbeespoort; Marten C. Van Dijken, Pretoria, all of South Africa

[73] Assignee: Cyclofil (Proprietary) Limited, Pretoria, South Africa

[ * ] Notice: The portion of the term of this patent subsequent to Dec. 11, 2007 has been disclaimed.

[21] Appl. No.: 360,067

[22] Filed: Jun. 1, 1989

[30] Foreign Application Priority Data

Jun. 2, 1988 [ZA] South Africa ........................ 88/3923
Feb. 14, 1989 [ZA] South Africa ........................ 89/1144

[51] Int. Cl.⁵ ................................................ B01D 45/16
[52] U.S. Cl. .......................................... 55/457; 55/396
[58] Field of Search ........................... 55/456, 457, 396

[56] References Cited

U.S. PATENT DOCUMENTS 1,215,935 2/1917 Hickman ............................ 55/457 X
2,323,707 7/1943 Danz .
2,574,370 11/1951 Bailey ................................ 55/457 X
2,806,551 9/1957 Heinrich ............................ 55/456 X
3,360,909 1/1968 Barnerias ........................... 55/457 X
3,421,296 1/1969 Beurer, Sr. ......................... 55/456 X
3,444,672 5/1969 Alsobrooks ......................... 55/457 X
3,448,563 6/1969 Sobeck .............................. 55/457 X
3,483,676 12/1969 Sargisson .......................... 55/457 X
3,520,114 7/1970 Pall et al. .......................... 55/457 X
3,590,560 7/1971 Pall et al. ............................. 55/457
3,611,679 10/1971 Pall ....................................... 55/457
3,616,616 11/1971 Flatt .................................. 55/457 X
3,713,280 1/1973 Keller et al. ....................... 55/457 X
3,825,212 7/1974 Darges et al. ..................... 55/457 X
3,895,930 7/1975 Campolong ....................... 55/457 X
3,915,679 10/1975 Roach et al. ...................... 55/457 X
4,008,059 2/1977 Monson et al. ........................ 55/396
4,050,913 9/1977 Roach ............................... 55/457 X
4,162,906 7/1979 Sullivan et al. .................... 55/457 X
4,255,174 3/1981 Simpson ............................ 55/457 X
4,289,611 9/1981 Brockmann ....................... 55/457 X
4,311,494 1/1982 Conner et al. ..................... 55/457 X

FOREIGN PATENT DOCUMENTS 0019057 11/1980 European Pat. Off. .
1465833 3/1977 United Kingdom .
1465915 3/1977 United Kingdom .
1526509 9/1978 United Kingdom .
2064359 6/1981 United Kingdom .
1592051 7/1981 United Kingdom .
1599006 9/1981 United Kingdom .

*Primary Examiner*—Robert Spitzer

[57] ABSTRACT

A vortex tube gas cleaning device 10 is used to clean a particle containing gas flow stream of particles. The device 10 has an outer tube 12 having an inlet 14 at an upstream end, and, in series downstream of the inlet 14 a vortex generator 16 in a vortex region 18, and a separation region 20. An inner extraction tube 30 is located at the downstream end of the tube 12 and extends concentrically within the outer tube 12, upstream, cantilever fashion. A peripheral outlet region 24 is defined annularly around the inner tube 30 downstream of the separation region 20 and leads to outlet ports 48. A central outlet region 28 is defined within the inner tube 30 downstream of the separation region 20 and leads to an outlet. The manner of location of the inner tube 30 ensures that the peripheral outlet region 24 is continuous or uninterrupted, especially also through an annular orifice 29. Upstream extremities 50 of the ports 48 are spaced from the annular orifice 29 a distance at least 25% of the nominal diameter of the tube 12.

12 Claims, 2 Drawing Sheets

VORTEX TUBE SEPARATING DEVICE

BACKGROUND OF THE INVENTION

1. Field of the Invention

This invention relates to a separating device suitable for use in treating a particle containing gas flow stream to separate the particles from the gas or to clean the gas of the particles.

2. Description of the Background Art

The kind of separating device to which the invention relates, can more precisely be described as a vortex tube particle recovery device or as a vortex tube gas cleaning device, depending on which aspect of its operation is emphasized. This invention primarily has in mind the cleaning of gas, especially the cleaning of air. Thus, for convenience, the term vortex tube gas cleaning device will generally be used in the specification. However, the invention covers also the particle recovery aspect.

The terms "upstream" and "downstream" are used for convenience in this specification and should be interpreted in relation to the normal direction of flow of gas through the gas cleaning device.

SUMMARY AND OBJECTS OF THE INVENTION

More specifically, the invention relates to a vortex tube gas cleaning device or particle recovery device suitable for use in treating a particle containing gas flow stream to clean the gas of particles or to recover particles from the gas, the device comprising an outer round tube having an inlet at one end which will be an upstream end in use;

an axially arranged vortex or rotating flow generator in the tube downstream of the inlet;

a separation region downstream of the vortex generator;

a peripheral outlet region toward the periphery of the tube downstream of the separation region;

a central outlet region toward the centre of the tube downstream of the separation region;

an inner round extraction tube, arranged concentrically within the outer round tube to separate the peripheral and central outlet regions, having an upstream end at a predetermined axial position corresponding to the downstream end of the separation region, said upstream end defining a central orifice for said central outlet region and a downstream end providing an outlet means for the central outlet region;

outlet means through the outer tube at a predetermined axial position toward a downstream end of the peripheral outlet region, the inner round extraction tube being located relative to the outer tube at a predetermined axial position of the gas cleaning device downstream of the outlet means and such as to extend canti-lever fashion in an upstream direction to provide a continuous annular flow passage in the peripheral outlet region;

a concentric locating formation extending annularly between the inner round extraction tube and the outer round tube to interlocate the inner round extraction tube and the outer round tube rigidly and concentrically, the axial position of the concentric locating member being such that it forms a downstream boundary of the peripheral outlet region, and such that the inner round extraction tube extends from the locating formation in an upstream direction canti-lever fashion; and a peripheral ring extending radially outwardly from the inner round extraction tube spatially downstream of the upstream end of the inner round extraction tube, and having, in series, a diverging annular leading surface, an annular crown, and a converging annular surface defining, respectively, in series, a converging flow contracting portion, an annular scavenge orifice and a diverging flow diffusing portion in the peripheral outlet region, walls bounding the separation region, an upstream portion of said peripheral outlet region and an upstream portion of said central outlet region being continuous and circular and said separation region, said upstream portion of said peripheral outlet region and said upstream portion of said central outlet region being free of circumferentially interrupted structure.

The annular flow passage may include an annular orifice for the peripheral outlet region, an or each upstream extremity of said outlet means being axially spaced downstream of the annular orifice a predetermined distance of at least about 25%, preferably at least about 30%, of the inner diameter of the outer round tube at its inlet.

Location of the inner tube relative to the outer tube may include concentric location of the inner tube relative to the outer tube male-female fashion by means of a socket portion at a downstream end of the outer tube and a complemental spigot portion of the inner tube.

Location of the inner tube relative to the outer tube may include axial location of the inner tube relative to the outer tube by means of complemental inter-abutting checking surfaces respectively of the outer and the inner tubes.

The outlet means may include peripheral ports through the outer tube at circumferentially spaced positions. This outlet configuration may advantageously be used when the periphery of the outer tube is parallel.

Instead, the outlet means may be provided by a single port in the outer tube, which port extends circumferentially continuously through an angle of between about 90° and about 180°. Said port may extend through an angle of about 120°. This outlet configuration may advantageously be used when the diameter of the outer tube, toward the downstream end of the device, increases.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
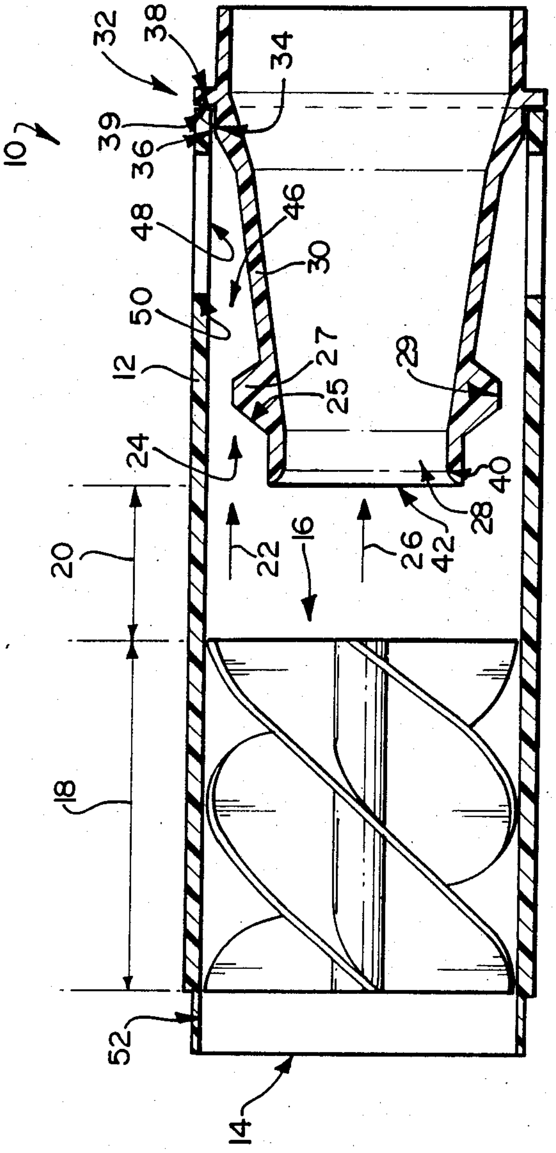
FIG. 1 is a cross-sectional view of a vortex tube gas cleaning device according to the present invention having a cylindrical outer tube.

With reference to FIG. 1 of the drawings, a vortex tube gas cleaning device in accordance with the invention is generally indicated by reference numeral 10.

The device 10 has an outer tube 12 of round cylindrical shape having an inlet 14 at one end which will be an upstream end in use.

Closely spaced downstream of the inlet 14, it has a vortex generator generally indicated by reference numeral 16 positioned in a vortex generating region 18.

Downstream of the vortex generating region 18, there is defined a separation region 20. In use, flow through the device 10 is divided in the separation region 20 into a peripherally outward scavenge flow stream 22 and a central or main flow stream 26.

Downstream of the separation region 20, there is defined a peripherally outward scavenge region 24 into which the scavenge flow stream 22 is directed. The scavenge flowstream is contracted toward an annular scavenge orifice 29, as will be described hereinafter.

Concentrically inward of the scavenge region 24, there is provided a central or main outlet region 28 into which the main flow stream 26 is directed in use.

The scavenge region 24 and the central outlet region 28 are separated by means of an inner extraction tube 30 having an inlet defined by a leading edge 42 of a central orifice 40 at the downstream end of the separation region 20. The extraction tube 30 diverges generally outwardly to meet the outer tube 12 and to be mounted to the outer tube 12 at a predetermined mounting position generally indicated by reference numeral 32. At the position 32, the inner tube 30 defines a concentric spigot formation 34 which may be slightly taper if desired. Further at the position 32, the inner periphery toward the downstream end of the outer tube 12 forms a concentric socket 36. The spigot formation 34 seats snugly, concentrically, in the socket 36. A shoulder 38 on a peripheral flange on the extraction tube 30 immediately downstream of the spigot formation 34, and a downstream end face 39 of the outer tube immediately downstream of the socket 36, form checking formations which inter-abut to locate the inner tube axially in relation to the outer tube.

Thus, by means of the connecting formations 34 and 36, the inner tube 30 is stabilized relative to and concentrically positioned or centered relative to the outer tube 12, canti-lever fashion. Thus, the inlet to the peripheral outlet region 24 is defined concentrically about the leading end of the inner tube 30. The inlet forms part of a continuous annular flow passage. The significance of the annular flow passage's being continuous is explained below.

Downstream of said inlet, a peripheral ring 27 having an oblique leading face 25 protrudes into the annular flow passage. The crown of the ring and the inner periphery of the outer tube 12 form the annular scavenge orifice 29. The ring 27 is integral with the inner tube 30 and extends from an outer periphery thereof. The oblique face 25 guides the scavenge flow stream 22 in contracting fashion into the scavenge orifice 29. Downstream of the scavenge orifice 29 there is defined an annular scavenge chamber 46 within the annular scavenge region 24. Circumferentially spaced ports 48 provided through the wall of the outer tube 12, lead from the scavenge chamber 46 and form circumferential outlet means for the scavenge flow 22. Upstream extremities 50 of the ports 40 are axially spaced a predetermined distance downstream of the scavenge orifice which is at least 25% of the internal diameter of the outer tube. In a preferred embodiment, the spacing is about 30% of said internal diameter.

In use, a particle containing gas flow stream enters the device 10 at the inlet 14. Rotating flow is generated in the vortex region 18 which induces the particles, which will be of higher specific gravity than the gas, to move outwardly on account of the rotating flow. Thus, the scavenge flow stream 22 will be enriched in respect of the particles and the main flow stream 26 will be depleted in respect of the particles. Expressed in other words, the gas is cleaned of particles, hence the term gas cleaning device.

The scavenge flow stream 22 enters the peripheral outlet region 24, is contracted as it flows into the scavenge orifice 29, and then enters the extraction chamber 46 from where it is exhausted via the ports 48.

The particle depleted or cleaned main flow stream 26 enters the central outlet region 28 and is exhausted from there.

A device in accordance with the invention has the advantage that rigid and positive co-axial or concentric alignment of the extraction tube is obtained by the mounting formations as described. Thus, the annular flow passage, especially the scavenge orifice 29 is continuous or uninterrupted which greatly enhances the flow characteristics of the scavenge flow stream in particular and flow through the device in general.

In this regard it is to be appreciated that flow through the device has strong axial and rotational components. The rotational component of the flow and the resulting centrifugal forces on the relatively heavy particles, induce concentration of the particles toward the periphery and depletion of the particles toward the centre of the device. Thus, the working of the device is dependant on the rotational component of the flow. The Inventors have established that any interruption, e.g. in the form of a spoke, detrimentally affects the rotational component of flow. Expressed in other words, by having the annular flow passage continuous, rotational component of flow in the outlet region is maintained which enhances working of the device in comparison to other devices having flow interruptions.

Furthermore, the Inventors have appreciated that rotating flow has an "upstream awareness" of flow interruptions. Thus, if a flow interruption is present, also flow upstream of the flow interruption is detrimentally affected. Therefore, in the presence of flow interruptions in the vicinity of the inlet to the scavenge region or the orifice of the scavenge region such as in other cleaning devices known to the Inventors, the rotational component of flow and thus the working of the device are detrimentally affected in the separation region.

This "upstream flow awareness" gives rise to the limitation of having the outlet means 48 and more specifically their upstream extremities 50 a predetermined minimum distance downstream of the orifice 29 which is a critical flow area in the working of the device. It has thus been found advantageous to symmetry or continuity of flow through the annular scavenge orifice to have the outlet port(s) for the scavenge stream positioned a predetermined minimum distance downstream of the annular scavenge orifice. Such minimum spacing prevents flow interruptions such as pillars or land areas intermediate the outlet ports from influencing the flow through the scavenge orifice.

The Inventors have established that, because of the complete symmetry or continuity in flow through the device on account of this feature, reduction in the amount of particles in the main flow stream is enhanced.

The Inventors have found, in tests with AC coarse dust, a five- to tenfold reduction in respect of particles above 10 micro metre in the main flow stream in devices in accordance with the invention in comparison to devices of the prior art.

In a test sample of the general configuration of FIG. 1 having an outer tube inner diameter of 18 mm, a total length of 60 mm, a vortex generating region length of 20 mm, a vortex angle of 180° and a central orifice inner diameter of 10 mm, and operating at a total pressure drop of 3.8 inch standard water gauge (about 0,96 kPa) and an air mass flow of 4,4 gram per second in the main flow stream 26, a total mass efficiency of dust removal of about 98% was obtained for AC coarse dust and operating at a scavenge flow of between about 6% and 14%, generally about 10%. The mass efficiency of removal of particles larger than 10 micrometer was 99.7%. It is to be appreciated that the larger portions are particularly detrimental to abrasion or errosion. Thus the good separation of large particles is significant.

Figure 2:
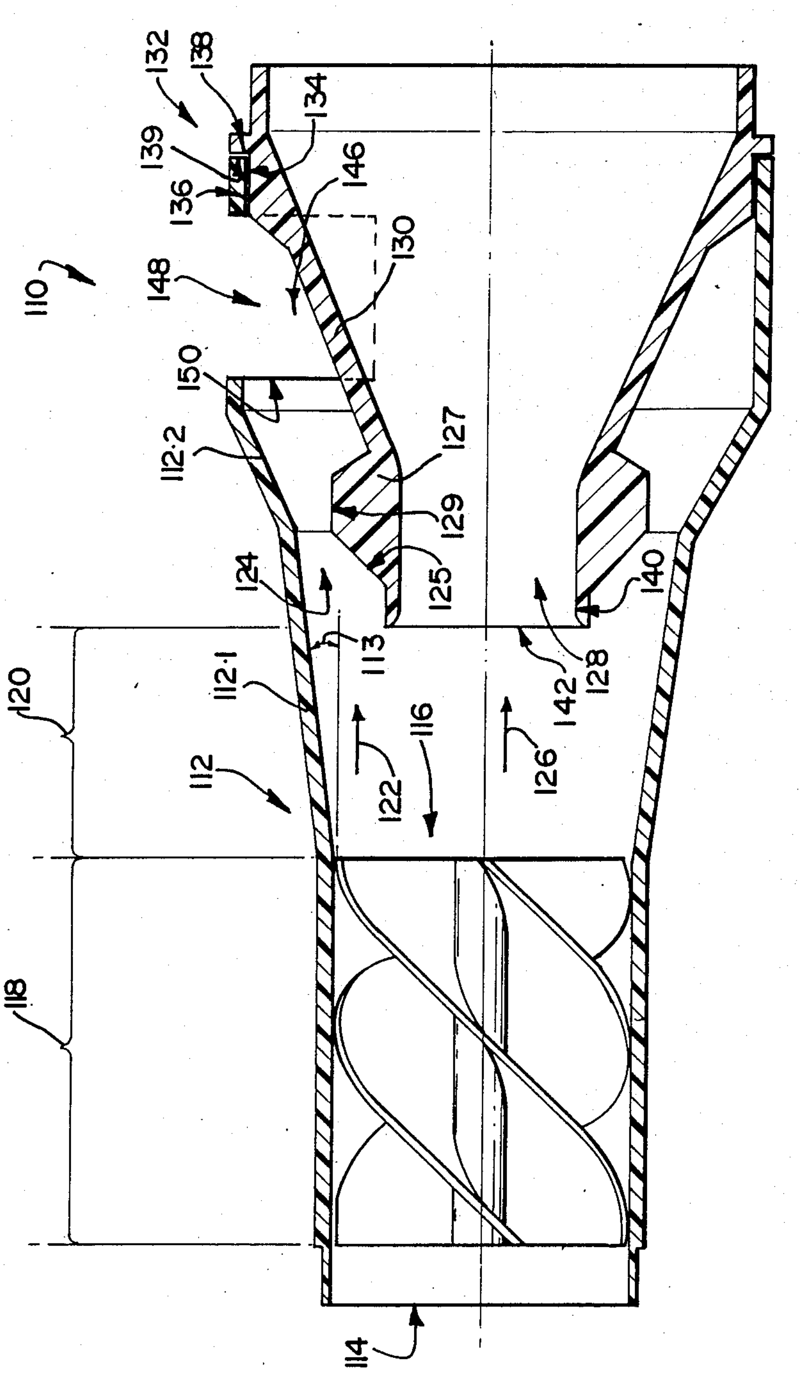
FIG. 2 is a cross-sectional view of a second embodiment of a vortex tube gas cleaning device according to the present invention having a partially diverging outer tube.

With reference to FIG. 2 of the drawings, another embodiment of a gas cleaning device in accordance with the invention is generally indicated by reference numeral 110. The device 110 is generally similar to the device 10 of FIG. 1, and like reference numerals refer to like features. The device 110 is not described in detail. Two differences of the device 110 to the device 10 are highlighted.

Whereas the device 10 has a parallel outer periphery which is conducive to a high packing density when the devices are used in a battery or an array, the outer diameter of the device 110 increases toward its downstream end. The increase in diameter is effected by means of a first divergence in the outer round tube 112 as indicated by angle 113. The diverging portion of the tube is indicated by 112.1 and extends through the separation region 120 and beyond, up to the axial position of the annular orifice 129.

The increase in diameter is further effected by means of a second divergence or diffuser region immediately downstream of the first divergence. The diffuser region is bounded by a diffuser wall portion 112.2.

The angle 113 is typically about 5°, i.e. the included angle of the first divergence is typically 10°.

The included angle of the diffuser region 112.2 may be between about 20° and about 50°, conveniently about 30°.

The second difference is that, whereas the device 10 has a plurality of circumferentially spaced outlet parts 48, the device 110 has a single, continuous outlet part 148 including an angle of about 120°.

Although the Applicant does not wish to be bound by theory, it is believed that the rotational component of flow in the outer peripheral region is better maintained with the outlet means configuration of FIG. 2.

Tests have shown that, especially in the event of a "cut" of 100%, i.e. substantially no flow through the peripheral outlet region, the particles nevertheless have a substantial rotational velocity component which can be maintained to a large extent in the outlet means configuration of FIG. 2, which is conducive to a good separating efficiency.

In a test sample of the general configuration of FIG. 2, having an included angle of divergence of 7°, an outer tube inner diameter of 18 mm, a total length of 60 mm, a vortex generating region length of 20 mm, a vortex angle of 180° and a central orifice inner diameter of 10 mm, and operating at a total pressure drop of 4 inch standard water gauge (about 1 kPa) and an air mass flow of 4,6 gram per second, a total mass efficiency of dust removal of about 97% was obtained for AC coarse dust and operating at a 100% cut, i.e. no scavenge flow.

For the same sample, and operating at 90% cut, the total pressure drop was 4 inch standard water gauge (about 1 kPa), the air mass flow was 4,6 gram per second in the main flow stream, and the separation efficiency was more than 98%.

Both tests were done with AC coarse dust.

The Inventors have made inventive contributions to a number of aspects of separating devices of the kind to which this invention relates. The instant invention emphasises one such aspect namely the provision of continuous flow in the outer peripheral region. It is to be appreciated that the feature of the current invention, together with features emphasized in copending applications by the same inventors, give rise to a number of advantages. Herebelow, those advantages to which the current invention contribute substantially, are highlighted. It is to be appreciated that the feature of the current invention in isolation, is not the sole factor in the advantages mentioned.

An important advantage of devices of the invention is the increased separation efficiency in relation to other, known devices.

In respect of relatively small devices of nominal diameters in the region of about 18 mm, and generally of the configuration of FIG. 1, tests were conducted using standardized particle concentrations under conditions simulating adverse operating conditions for turbines such as in aircraft, e.g. helicopters. Currently available separating devices, and which are used in turbines of the kind described, yielded particle removal values of about 95% at best i.e. in terms of the particular tests, 5% or more of the particles remained in the intake airstream of the turbines. In contrast, separating devices in accordance with the invention yielded particle removing rates of 97% to 98% i.e. only about 3% to 2% of particles remaining in the inlet stream.

The significance of separation efficiency can be appreciated if the effect of separation efficiency on the life expectancy of blades of large turbines is considered.

If the separation efficiency of the inlet system increases from 94% to 95%, the life expectancy is doubled, and if the efficiency then increases to 97%, the life expectancy is doubled again. Thus, by increasing the efficiency of 94% currently obtainable to 97% (obtainable by devices of the invention) the life expectancy increases by a factor 4.

In certain anti air pollution applications utilizing industrial cyclones, particle removal efficiencies investigated by the Applicant vary between about 30% and about 50%. A major contributing factor to such bad performance, is the unsuitability of cyclones for the specific applications. Under the same conditions, and utilizing separating devices in accordance with the invention, generally the device of FIG. 2 and having nominal inlet diameters typically of about 100 mm, particle removal efficiencies of between about 80% and about 90% were obtained. Expressed in other words, the degree of air pollution on account of particles was only about 30% (worst cases) or 20% (best cases) of the air pollution in the case of conventional devices.

Furthermore, it was found that devices in accordance with the invention were more effective than conventional cyclones in removing particles smaller than 7 micro-meter. This is of particular importance when it is borne in mind that a human's natural protection against particles, such as nasal hairs, deteriorates significantly against particles smaller than 7 micro-meter. Furthermore, alveoli in human lungs typically have cross sections of about 7 micro-meter, and are thus particularly vulnerable to particles smaller than 7 micro-meter.

Separation devices in accordance with the invention have been found to be superior to conventional cyclones in removing particles of relatively low density.

A second advantage of the invention lies in a wide operating range. The Inventors have found that the absence of flow interruptions in the peripheral outlet region is conducive to flow stability. This is, inter alia, beneficial in applications requiring a wide operating range in terms of flow capacity and operating pressures. Thus, separating devices in accordance with the invention of small nominal diameter (18 mm) have been found to have wider operating ranges for a given minimum separation efficiency than known devices tested by the Inventors.

A further advantage is that separating devices, especially devices generally like the embodiment of FIG. 2 for use in industrial applications, can be used under conditions of 100% cut i.e. substantially no gas flow in the peripheral outlet region. This allows treatment of the scavenge stream to be greatly simplified because merely the particles need to be removed as there is no gas flow stream to treat.

It has also been found an advantage in respect of separating device suitable for anti-pollution applications that they are more compact than conventional cyclones.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A vortex tube gas cleaning device or particle recovery device suitable for use in treating a particle containing gas flow stream to clean the gas of particles, or to recover particles from the gas, the device comprising an outer round tube having an inlet at one end which will be an upstream end in use;

an axially arranged vortex or rotating flow generator in the tube downstream of the inlet;

a separation region downstream of the vortex generator;

a peripheral outlet region toward the periphery of the tube downstream of the separation region;

a central outlet region toward the center of the tube downstream of the separation region;

an inner round extraction tube, arranged concentrically within the outer round tube to separate the peripheral and central outlet regions, having an upstream end at a predetermined axial position corresponding to the downstream end of the separation region, said upstream end defining a central orifice for said central outlet region, and a downstream end providing an outlet means for the central outlet region;

outlet means through the outer tube at a predetermined axial position toward a downstream end of the peripheral outlet region;

a concentric locating formation extending annularly between the inner round extraction tube and the outer round tube to interlocate the inner round extraction tube and the outer round tube rigidly and concentrically, the axial position of the concentric locating member being such that it forms a downstream boundary of the peripheral outlet region, and such that the inner round extraction tube extends from the locating formation in an upstream direction canti-lever fashion; and a peripheral ring extending radially outwardly from the inner round extraction tube spatially downstream of the upstream end of the inner round extraction tube, and having, in series, a diverging annular leading surface, an annular crown, and a converging annular surface defining, respectively, in series, a converging flow contracting portion, an annular scavenge orifice and a diverging flow diffusing portion in the peripheral outlet region, walls bounding the separation region, an upstream portion of said peripheral outlet region and an upstream portion of said central outlet region being continuous and circular and said separation region, said upstream portion of said peripheral outlet region and said upstream portion of said central outlet region being free of circumferentially interrupted structure.

2. A device as claimed in claim 1, in which an upstream extremity of said outlet means is axially spaced downstream of the annular scavenge orifice a predetermined distance of at least about 25% of the inner diameter of the outer round tube at its inlet.

3. A device as claimed in claim 2, in which the outlet means includes peripheral ports through the outer tube at circumferentially spaced positions and spaced downstream of the annular orifice about 30% of the inner diameter of the outer round tube at its inlet.

4. A device as claimed in claim 2 in which said predetermined distance is about 30%.

5. A device as claimed in claim 1, in which the inner round extraction tube diverges substantially to the diameter of the outer round tube to form a divergence, said divergence providing the locating formation, and in which location of the inner tube relative to the outer tube includes concentric location of the inner tube relative to the outer tube male-female fashion by means of a socket portion at a downstream end of the outer tube and a complemental spigot portion of the inner tube.

6. A device as claimed in claim 5, in which location of the inner tube relative to the outer tube includes axial location of the inner tube relative to the outer tube by means of complemental inter-abutting checking surfaces respectively of the outer and the inner tubes.

7. A device as claimed in claim 5, in which the outlet means is in the form of radially open, axially and part circumferentially extending outlet means including at least one port through the outer tube, and in which said location of the inner tube relative to the outer tube is at a position closely downstream of a downstream extremity of the outlet means, the radial width of the peripheral passage diminishing in an axial direction over the axial extent of the outlet means.

8. A device as claimed in claim 1, in which the outer tube includes a divergence in a portion thereof axially between the annular orifice and an upstream extremity of the outlet means, and in which the outlet means is provided by a single port in the outer tube, which port extends circumferentially continuously through an angle of between about 90° and about 180°.

9. A device as claimed in claim 8 in which said port extends through an angle of about 120°.

10. A device as claimed in claim 1, in which said upstream portions of said peripheral outlet region and said central outlet region extend downstream beyond the flow diffusing portion.

11. A vortex tube gas cleaning device or particle recovery device suitable for use in treating a particle containing gas flow stream to clean the gas of particles, or to recover particles from the gas, the device comprising:

an outer round tube having an inlet at one end which will be an upstream end in use;

an axially arranged vortex or rotating flow generator in the tube downstream of the inlet;

a separation region downstream of the vortex generator;

a peripheral outlet region toward the periphery of the tube downstream of the separation region;

a central outlet region toward the center of the tube downstream of the separation region;

an inner round extraction tube which is arranged concentrically within the outer round tube to separate the peripheral and central outlet regions, the inner round extraction tube having an upstream end at a predetermined axial position corresponding to the downstream end of the separation region, said upstream end defining a central orifice for said central outlet region, and a downstream end providing an outlet means for the central outlet region;

outlet means through the outer tube at a predetermined axial position toward a downstream end of the peripheral outlet region; and a concentric locating formation extending annularly between the inner round extraction tube and the outer round tube to interlocate the inner round extraction tube and the outer round tube rigidly and concentrically at a locating position, the axial position of the concentric locating member being such that it forms a downstream boundary of the peripheral outlet region, and such that the inner round extraction tube extends from the locating formation in an upstream direction canti-lever fashion, in which the outlet means includes through the outer tube at least one radially exposed, part circumferentially and axially extending port having an upstream extremity and a downstream extremity, said upstream extremity of said at least one port being spaced downstream of an inlet to the peripheral outlet region a predetermined distance, said inner round extraction tube having a length and being divergent along a predetermined portion of said length at a position adjacent to said part circumferentially and axially extending port, said peripheral outlet region being convergent along said predetermined portion of said length of said inner round extraction tube at said position adjacent to said part circumferentially and axially extending port.

12. A device as claimed in claim 11 in which said locating position of said inner round extraction tube to said outer round tube is closely downstream of said downstream extremity of the outlet means.

* * * * *